Oct. 6, 1942.  F. R. HIGLEY ET AL  2,297,763
DEHUMIDIFIER CONTROL
Filed Dec. 27, 1938  2 Sheets-Sheet 1

INVENTOR.
FRANK R. HIGLEY AND
ERIC H. RYDEN
BY Kwis Hudson & Kent
ATTORNEYS

Oct. 6, 1942.    F. R. HIGLEY ET AL    2,297,763
DEHUMIDIFIER CONTROL
Filed Dec. 27, 1938    2 Sheets-Sheet 2

INVENTOR.
FRANK R. HIGLEY AND
ERIC H. RYDEN
BY Kwis Hudson & Kent
ATTORNEYS

Patented Oct. 6, 1942

2,297,763

UNITED STATES PATENT OFFICE 2,297,763

DEHUMIDIFIER CONTROL

Frank R. Higley, Cleveland Heights, and Eric H. Ryden, Bedford, Ohio, assignors to The Bryant Heater Company, Cleveland, Ohio, a corporation of Ohio Application December 27, 1938, Serial No. 248,020

6 Claims. (Cl. 183—4)

This invention relates to improvements in dehumidifier controls, that is to say controls for regulating the degree of heat used in the activation of the adsorbent material. The invention also includes a novel form of humidostat which may find utility in other connections.

One of the objects of the invention is the provision of a humidity responsive instrument or humidostat which is dependent for operation upon the weight of the moisture adsorbed by a quantity of adsorbent material.

Another object of the invention is the provision of a humidostat which is accurate and dependable in its operation for an indefinite length of time and yet simple and inexpensive.

Another object is the provision of simple controls in which our improved humidostat constitutes the governing element.

Still another object is the provision of a control in which a part or all of the supply of moisture adsorbent material employed in a dehumidifier is itself used as a part of the humidity responsive means.

Other objects and features of novelty will appear as we proceed with the description of those embodiments of the invention which, for the purposes of the present application, we have illustrated in the accompanying drawings, in which Fig. 1 is a diagrammatic view partially in vertical section of a gas line throttle valve with means for controlling the same comprising our novel humidostat, and intended for use in connection with a dehumidifier.

Figure 1:
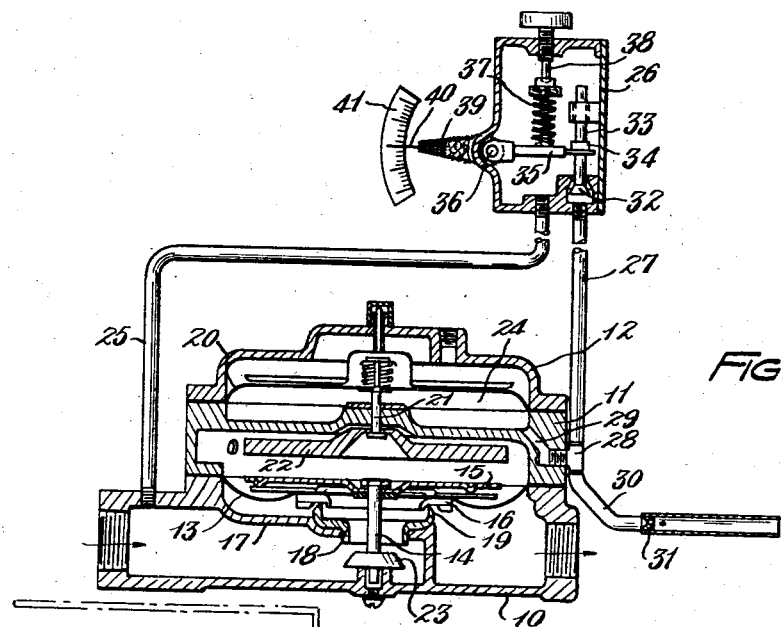

In Fig. 1 of the drawings we have illustrated a throttling valve comprising three castings 10, 11 and 12 which may be secured together by suitable means. The valve is interposed in a gas line in such manner that the flow of gas shall be in the direction of the arrows. Between the castings 10 and 11 there is mounted a flexible diaphragm 13 at the center of which there is clamped a depending valve stem 14. At the top of this stem above the diaphragm there is also clamped a circular plate 15 which functions as a light weight. An annular valve piece 16 with a resilient under face is attached to the lower side of the diaphragm concentrically with stem 14. The casting 10 includes an intermediate wall 17 which is provided with an opening for the reception of a sleeve 18 which has an annular seat 19 for cooperation with the valve piece 16. The seat 19 and the valve piece 16 when in the position illustrated completely close off the flow of fuel through the valve. Closure of the valve is effected by introducing gas pressure above the diaphragm 13 by suitable means well known in the art, not herein disclosed, so that the pressure above and below the diaphragm is equalized when the weight 15 will close the valve by gravity. Opening the valve is accomplished by exhausting gas from the chamber above the diaphragm, whereupon the gas pressure underneath the diaphragm raises it and opens the valve.

Between the castings 11 and 12 there is interposed another diaphragm 20, to which is resiliently attached the upper end of a central pin 21 that is free to slide through a central opening in the casting 11. The latter casting divides the valve into an upper diaphragm compartment and a lower diaphragm compartment, and in the latter compartment there is a second weight 22 which is heavier than weight 15. This weight 22 has a central opening loosely receiving the pin 21 which is headed on its lower end and is thereby adapted to support the weight.

The stem 14 carries a mushroom valve 23. In the position in which it is illustrated in Fig. 1 this valve 23 has no effect, but when raised more or less above that position it cooperates with the sleeve 18 to throttle the gas flow to a greater or lesser extent depending upon the height to which it is raised. When there is no pressure in the chamber 24 beneath diaphragm 20 weight 22 rests upon weight 15 and the two weights together oppose the gas pressure beneath diaphragm 13, so that the diaphragm and weights may be said to float on the gas beneath the diaphragm, the valve 23 being raised somewhat and therefore acting to cut down the flow of gas to a certain extent dependent upon the mass of the weights 15 and 22. In this manner the gas pressure at the burner may be regulated and maintained substantially constant. A valve of the general character of that herein illustrated and having this pressure regulating function is disclosed and claimed in Fox Patent 2,111,560, dated March 22, 1938.

Now, if sufficient fluid under pressure is admitted to chamber 24, weight 22 will be lifted more or less, and its tendency to depress valve 23 will be correspondingly decreased, thereby permitting that valve to rise and throttle the gas flow to an extent dependent upon the height to which the weight 22 is raised. The throttling mechanism per se forms no part of the present invention, and hence is not herein described in any considerable detail.

In the present instance the pressure maintained in chamber 24 of the valve is controlled by our novel humidostat, and the pressure medium used is gas. A branch conductor 25 in continuous communication with the gas supply leads to a gas-tight box 26 which may be mounted at any convenient place where it will be exposed to the air to be conditioned, as for instance in one of the rooms of the premises. A second branch conductor 27 extends from the box 26 back to the main vave where it is connected through a union 28 and a drilled passage 29 with chamber 24. The union 28 is also connected with a pipe 30 in which there is a bleed hole 31, this pipe terminating at or near a gas burner that may be employed for heating the activating air of a dehumidifying apparatus (not shown).

The rate of flow of gas through the branch conductors 25 and 27 is controlled by a valve 32 at the lower end of a stem 33 which is slidably mounted in a guide carried by box 26. This stem has secured thereto a collar 34, the underside of which is engaged by a bifurcated extremity on a lever 35 that is pinned or keyed to a shaft 36 which is journaled in the walls of the box 26 and extends therebeyond at one end. Lever 35 is biased downwardly, as by means of a coil spring 37 the compression of which may be adjusted by means of a screw 38 threadedly mounted in the top of the box. Outside of the box there is secured to shaft 36 a weight arm comprising a foraminous container 39 which is filled with moisture adsorbent material, for example silica gel or activated alumina.

When the moisture content of the air surrounding the container 39 is low the container because of its light weight will swing upward and the lever 35 will swing downward opening valve 32 wide and permitting a free flow of gas into chamber 24, whereupon pressure will build up in chamber 24 causing pin 21 to lift weight 22, which will permit gas pressure beneath diaphragm 13 to raised throttle valve 23 to a nearly closed position. Thus the flow of fuel to the dehumidifier burner will be cut down to meet the reduced requirements of the apparatus. On the other hand when the moisture content of the air surrounding container 39 is high the moisture adsorbed by the material within the container will increase the mass of the weight arm and the latter will swing downward, causing lever 35 to raise valve 32 toward closed position. Now the pressure in chamber 24 will be reduced, weight 22 will be permitted to descend and rest upon weight 15, and the two weights will depress throttle valve 23 to permit a higher rate of flow of gas to the burner to thereby meet the additional load put upon the apparatus.

At the free end of container 39 we may mount a pointer 40 to run over a scale 41 which may be graduated in units to indicate the degree of humidity in the atmosphere. In effect the instrument weighs the moisture in the container 39, and the valve 32 is affected by the condition of balance of the weighing instrument. The instrument is therefore a humidostat which functions in accordance with the weight of moisture in a given quantity of adsorbent material.

Figure 2:
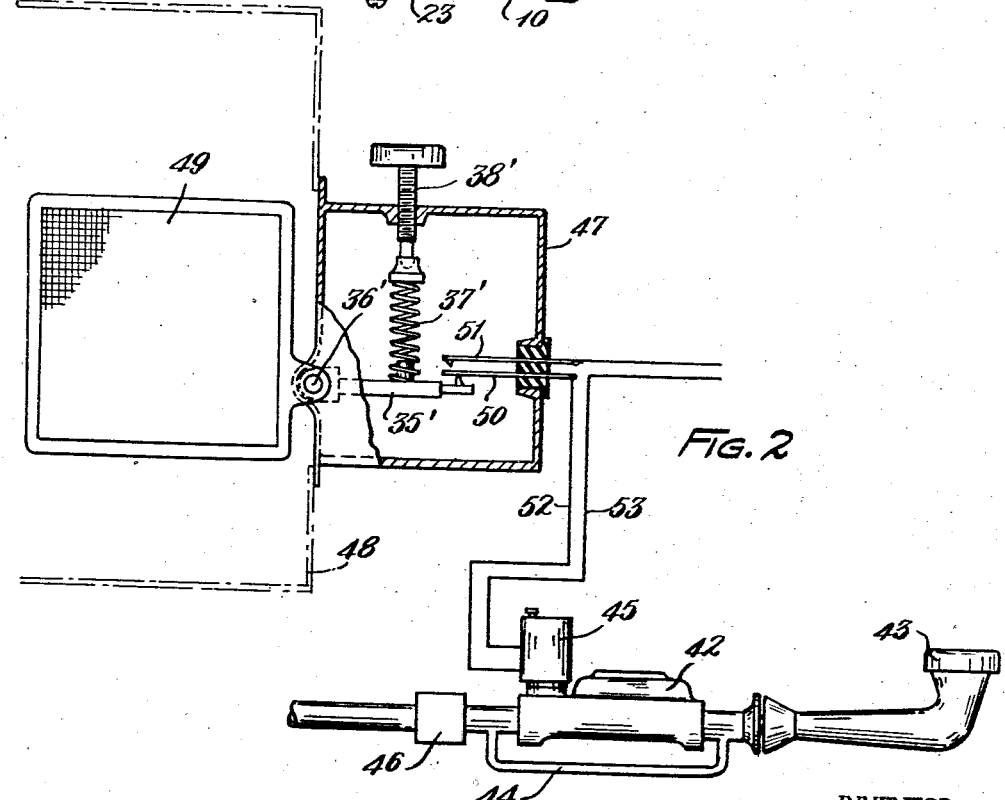
Fig. 2 is a diagrammatic view of a different form of the invention wherein the humidostat operates on "on" and "off" control.

In that form of the invention illustrated in Fig. 2 a diaphragm valve of the on and off type, somewhat like that of the Fox patent referred to above, is indicated at 42. A certain amount of gas is always permitted to flow to the burner 43 through a by-pass 44 around valve 42. 45 is a solenoid valve of conventional form adapted when energized to reduce pressure above the diaphragm and permit the main valve to open, and when deenergized to build up pressure above the diaphragm for closing the valve. The valve does not contain throttling means in this case. A manual control valve is indicated at 46.

In this second form of the invention a box 47, similar to box 26, is mounted upon an air conductor 48 in the return side of the circulating line in front of an opening through the wall of the conductor. A shaft 36', similar to shaft 36, carries a thin disk-shaped container 49 comprising two screens set rather close together, the space between them being filled with moisture adsorbent material. Air passing through the conductor towards the dehumidifier of course acts upon the adsorbent material and quickly effects changes in the weight of the contained adsorbent. In this form of the invention the lever 35', the spring 37' and the screw 38' are substantially the same in structure and function as the corresponding parts in Fig. 1, except that the lever 35' at its free extremity has an upwardly extending projection which is adapted to engage the lower one of two spring metal contact fingers 50 and 51 that are normally separated, that is to say they are separated when the humidity in the conductor 48 does not exceed a predetermined value. The fingers 50 and 51 are connected electrically with the solenoid 45 by suitable conductors including the wires 52 and 53 respectively.

When the moisture content of the air in conductor 48 is high, container 49 descends and raises lever 35', causing contact fingers 50 and 51 to come together and close the circuit through solenoid 45. Valve 42 then opens and gas flows to the burner not only through the by-pass 44 but also through the valve 42 to produce maximum flow. When the humidostat opens contact fingers 50 and 51 on the other hand, in response to the presence of drier air in conductor 48, the solenoid valve 45 causes the closing of main valve 42, whereupon the burner is served only by the by-pass 44 and its flame is cut down proportionately. In this form of the invention therefore there is no gradual throttling of the gas burner, the on and off condition of the valve 42 merely shifting the burner from fully on position to one-half of some other fractional part of full operation.

Figure 3:
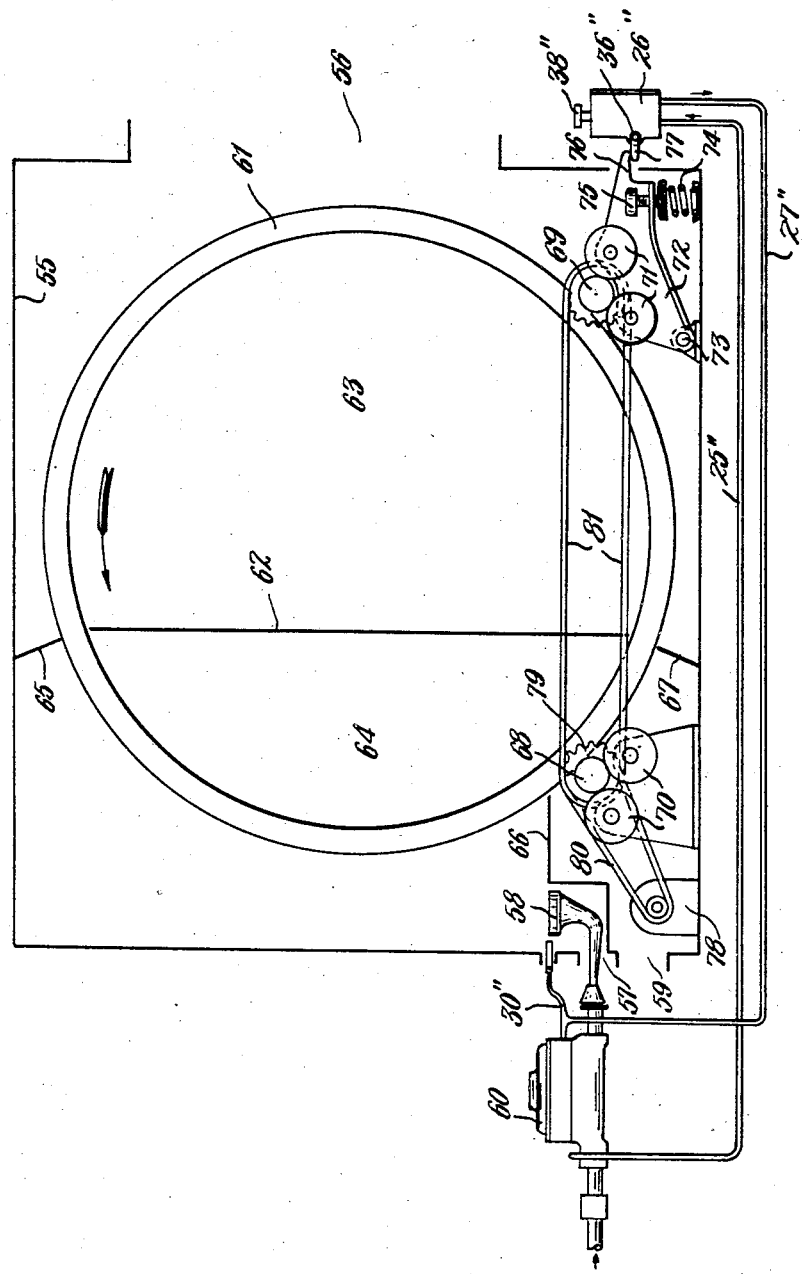
Fig. 3 is a diagrammatic elevational view of a dehumidifying apparatus of the continuous type, wherein the moisture adsorbent material of the dehumidifier is itself used as a part of a humidostat for controlling the heater for the activating air.

In Fig. 3 we have illustrated a special application of our invention wherein the dehumidifier itself constitutes part of the humidity responsive control means. In this figure 55 represents the casing of a dehumidifying unit. The air to be treated enters the casing through an opening 56. Activating air enters at 57, flowing up into the casing around the burner 58. Purging air enters at 59. The gas line is provided with a diaphragm valve 60, similar to that illustrated in Fig. 1 and functioning to throttle gas flow in the manner heretofore described with respect to Fig. 1.

Within the casing there is a drum 61 containing moisture adsorbent material, the interior of the drum being divided by a fixed partition 62 into an adsorbing compartment 63 and an activating compartment 64. Outer baffles or partitions 65, 66 and 67 confine the flow of circulating air into compartment 63 of the drum and the flow of activating and purging air into the compartment 64 of the drum, the baffle 66 separating the activating air from the purging air. Blowers, not shown, are located in a front end wall of the unit for inducing the flow of air in the directions above indicated. For a more complete disclosure and explanation of the dehumidifier construction reference should be had to the copending application, of Frank R. Higley, Serial No. 248,019, filed of even date herewith.

The drum 61 is supported by two parallel, small diameter shafts 68 and 69 that may be supported at their ends in pairs of rollers 70 and 71, one pair only for each shaft being illustrated in Fig. 3. The two pairs of rollers 70 have fixed bearings, but the rollers 71 are carried by a bracket 72 which is pivotally mounted at 73. The side of the bracket opposite the pivot or hinge 73 is supported upon one or more coil springs 74 through adjusting screws 75. An arm 76 of the bracket engages the upper side of a lever arm 77 that is fixed to a shaft 36" journaled in a box 26" that is similar in construction and function to the box 26 of Fig. 1 and contains apparatus of the same character. Branch pipes 25" and 27" connect the box 26" to the gas line and to the main valve in the same manner as in the case of the branch pipes 25 and 27 of Fig. 1. In order to revolve the drum power may be applied to rotate either one or both of the shafts 68 and 69. To that end a small motor 78 may be employed to drive a pulley 79 on shaft 68 by means of a belt or chain 80, and shafts 68 and 69 may be operatively interconnected by means of a belt or chain 81.

It will be evident that while the apparatus is in operation the weight of the drum with its contents will vary as the humidity of the air circulating in the premises varies. The bracket 72 with its associated parts weighs a proportionate share of the total mass of the drum and contents, and the variation in this weight is used to manipulate a valve in the box 26" similar to the valve 32 of Fig. 1, by means of which the gas flow in gas pipes 25" and 27" is controlled for the purpose of throttling the flow of gas to the main burner and maintaining the flame in the latter at the proper intensity at all times.

Having thus described our invention, we claim:

1. In dehumidifying apparatus, a rotatable drum carrier for moisture adsorbent material, a pair of spaced supports for said carrier, one of said supports being mounted to have limited up and down travel in response to variations in the weight of the moisture content of the adsorbent material in the carrier, a heater for activating the material in the carrier, and means actuated by the up and down movement of said last named support for controlling the operation of said heater.

2. In dehumidifying apparatus, a carrier for moisture adsorbent material, said carrier being mounted to revolve continuously and to expose the adsorbent material during each revolution first to the air to be conditioned and thereafter to the activating air, a heater for the activating air, supports for said carrier, one of said supports being mounted to have limited up and down travel in response to variations in the weight of the moisture content of the adsorbent material in the carrier, and means actuated in response to the up and down movement of said last named support and carrier for controlling the operation of said heater.

3. In dehumidifying apparatus, a rotating drum in which the adsorbent material is carried, a pair of spaced supports for said drum, one of the said supports being mounted to have limited up and down travel in response to variations in the weight of the moisture content of the adsorbent material in the drum, a burner for activating the material in the drum, and means actuated by the up and down movement of said last named support for varying the flow of fuel to said burner.

4. In dehumidifying apparatus, a drum in which the adsorbent material is carried, a heater for activating said material, a pair of spaced shafts upon which the drum rests, means for rotating one of said shafts to revolve the drum, one of said shafts being mounted to have limited up and down travel in response to variations in the weight of the moisture content of the adsorbent material in the drum, and means actuated in response to the up and down movement of the last named shaft and the drum for controlling the operation of said heater.

5. In dehumidifying apparatus, a drum in which the adsorbent material is carried, a heater for activating said material, resilient mounting means supported said drum for rotation about its axis, said resilient mounting means being adapted to yield in response to increases in the weight of the moisture content of the adsorbent material in the drum, means for rotating the drum, and means acting in response to the up and down movements of the drum for controlling the operation of said heater.

6. In dehumidifying apparatus, a rotatable drum carrier for moisture adsorbent material, a weighing beam operatively connected with said carrier, said carrier being adapted to have limited up and down travel in response to variations in the weight of the moisture content of the adsorbent material in the carrier, a heater for activating the material in the carrier, and means actuated by the movement of said weighing beam for controlling the operation of said heater.

FRANK R. HIGLEY.
ERIC H. RYDEN.